United States Patent [19]

Hyppänen

[11] Patent Number: 5,759,495
[45] Date of Patent: Jun. 2, 1998

[54] METHOD AND APPARATUS FOR TREATING HOT GASES

[75] Inventor: Timo Hyppänen, Karhula, Finland

[73] Assignees: A. Ahlstrom Corporation, Noormarkku, Finland; Hismelt Corporation PTY. Limited, Kwinana, Australia

[21] Appl. No.: 683,464

[22] Filed: Jul. 18, 1996

Related U.S. Application Data

[62] Division of Ser. No. 636,631, Apr. 23, 1996, Pat. No. 5,585,071, which is a continuation of Ser. No. 255,880, Jun. 8, 1994, abandoned.

[30] Foreign Application Priority Data

Nov. 6, 1993 [FI] Finland ............... FI 932 672

[51] Int. Cl.[6] ......................................... F27B 15/16
[52] U.S. Cl. .................... 422/146; 422/141; 422/147; 165/104.16; 165/104.18; 122/4 D
[58] Field of Search ................... 422/139, 145, 422/146, 147, 143; 122/4 D; 165/104.16, 104.18, 106; 34/578, 589, 591, 363, 370; 110/245, 216

[56] References Cited

U.S. PATENT DOCUMENTS

| | | | |
|---|---|---|---|
| 5,167,932 | 12/1992 | Ruotto | 422/146 |
| 5,171,542 | 12/1992 | Sarkomaa | 422/146 |
| 5,205,350 | 4/1993 | Hirsch et al. | 165/104.18 |
| 5,281,398 | 1/1994 | Hyppanen et al. | 422/146 |
| 5,332,553 | 7/1994 | Hyppanen | 422/147 |
| 5,372,096 | 12/1994 | Skowyra | 422/146 |

FOREIGN PATENT DOCUMENTS

| | | |
|---|---|---|
| 70377 | 3/1986 | Finland. |
| 88200 | 12/1992 | Finland. |

*Primary Examiner*—Hien Tran
*Attorney, Agent, or Firm*—Nikaido Marmelstein Murray & Oram, LLP

[57] ABSTRACT

A method and apparatus for treating hot process gases produced in high temperature processes in a circulating fluidized bed reactor. The reactor (10) includes a mixing chamber (12), a particle separator (16) and a return duct (18) for returning the circulating mass from the particle separator to the mixing chamber. The return opening (24) of the return duct is so arranged that the flow of solids entering the mixing chamber via the opening is directed substantially downwardly. The inlet (22) for hot process gas is so arranged as to allow the hot process gas to flow into the mixing chamber as a substantially upwardly directed solids flow so that the solids flow comes into contact with the gas flow.

6 Claims, 3 Drawing Sheets

METHOD AND APPARATUS FOR TREATING HOT GASES

This is a divisional of application Ser. No. 08/636,631 filed Apr. 23, 1996 (now U.S. Pat. No. 5,585,091), which is a continuation of Ser. No. 08/255,880 filed Jun. 8, 1994.

The present invention relates to a method and apparatus or treating hot process gases produced in high temperature processes in a circulating fluidized bed reactor, whereby the reactor comprises

- a mixing chamber, in which the hot process gases are mixed with the solids forming the circulating mass to form a gas suspension;
- a particle separator for separating the solids from the treated process gases;
- means for feeding the hot process gases; into the mixing chamber;
- a riser or a duct arranged on top of the mixing chamber in connection therewith for conducting the gas suspension from the mixing chamber to the particle separator;
- a gas outlet for removing the treated process gases from the particle separator and
- a solids return duct for returning the solids separated in the particle separator to the mixing chamber.

Circulating fluidized bed reactors are especially suitable for cooling hot gases containing molten and/or vaporized components and/or tar-like particles.

Circulating bed gas coolers are thus suitable for dry purifying of gases containing dust and tar end other condensable components resulting from partial oxidation of biomasses, peat or coal. The gas fed into the mixing chamber can be quickly cooled by means of the high-volume return flow of solids from the particle separator in the return duct to a temperature level, at which harmful gaseous or liquid components are condensed and tarry substances turn to dry, solid substances. The solids can then be easily separated from the cooled gas. Circulating bed gas coolers can also be used in chemical processing, for example preheating and pre-reduction of iron concentrate, whereby the concentrate is firstly preheated and pre-reduced in the fluidized bed by means of the hot process gas from iron smelting. As the preferable temperature for reducing is 800°–950° C., cooling surfaces for adjusting the temperature of the circulating mass will have to be built into the circulating mass reactor to maintain this temperature. The preheating and reducing of iron concentrate is usually not sufficient for cooling. The necessary cooling surfaces are usually located as convection heat surfaces in the riser or duct located above the mixing chamber.

In the above-mentioned circulating bed gas coolers the mixing chamber is a fluidization chamber of the so-called spouting bed type, i.e. a fluidization chamber provided with a jet flow, in which the hot process gas also acts as the fluidizing gas.

The fluidization chamber, i.e. the mixing chamber is, in known solutions, usually formed of an upwardly widening conical lower part, a cylindrical interemediate part attached concentrically thereto and an upwardly narrowing conical upper part, attached concentrically to the intermediate part. The hot process gas inlet, which usually is round, is attached concentrically to the bottom of the conical lower part. The riser of the fluidlized bed reactor is accordingly attached concentrically to the conical upper part.

The fluidizing gas jet causes a portion of the particles in the fluidized bed to flow upwards in the mixing chamber and further towards the periphery of the conical chamber. The velocity of the solids particles is, however, decelerated towards the periphery of the chamber and the particles even start to move in a downward direction. The solid material particles moving downwards are directed towards the gas inlet at the conical bottom of the mixing chamber, where the hot gas flowing in through the inlet entrains the particles and transmits them again to the upper portion of the mixing chamber. Thus, a fountain-like flow of solids is formed inside mixing chamber. A portion of the solid particles flows continuously out from the upper part of tie fluidization chamber into the riser and from there further to the particle separator. Solids can, if desired, be fed or removed directly from the mixing chamber.

In circulating fluidized bed reactors the return duct for the circulating mass is connected to the side wall of the mixing chamber, from its lower part, e.g., to the side wall of the cylindrical intermediate part. Thus, the circulating mass returning from the return duct to the mixing chamber firstly flows downwardly along the walls of the mixing chamber, mixing little by little with the hot gas and flowing finally from the central part of the mixing chamber up to the riser with the hot gas jet.

The aim is to quickly cool the hot gas jet from the gas inlet or venturi in order to solidify the vaporized and molten components into solid particles. Simultaneously, it is the intention to radically minimize the momentum of the gas jet to avoid erosion and blocking on the heat surfaces. Usually, the amount of solids in the mixing chamber is sufficient to accomplish this reasonably fast, but in may cases problems do occur.

For example, when the gas flow increase in a fluidization chamber of the spouted bed type, the solid material particles flowing downwardly along the conical wall are partially pushed sideways, out of the reach of the gas jet so as not to mix with the gas jet. Thus, an area of low solids density is formed directly above the gas inlet. When the gas velocity is further increased, the area of low solids density penetrates even deeper into the mixing chamber. So, a jet flow of gas suspension can be formed through the whole of the mixing chamber, whereby the gas flows essentially uncooled directly to the riser.

In circulating fluidized bed reactors with a strong jet flow of gas suspension, wear has been detected for the above-mentioned reasons in the cooling surfaces located in the first portion of the riser. It has been supposed, that the wear is due the hot gas jet flow reaching uncooled the cooling surfaces. The wear is partly due to the temperature of the gases, partly due to the local high flow velocity of the gases.

With the jet flow reaching the cooling surfaces, the clogging up and sooting of the surfaces can cause problems. If the hot gases are not cooled before reaching the cooling surfaces of the riser, the impurities are not condensed until they reach these cooling surfaces, instead of being condensed on the circulating mass particles, as is intended.

The object of the present invention is to provide an improved method and apparatus for treating hot process gases generated in high temperature processes by means of a circulating fluidized bed. A special meaning is to provide an improved method and apparatus for avoiding the above-mentioned drawbacks.

Additionally, it is an object of the invention to provide an improved transverse mixing of the gas suspension and solid material particles in a circulating fluidized bed reactor utilized for treating hot process gases.

It is characteristic of the method according to the invention for achieving the objects of the invention that in a circulating fluidized bed reactor at least a portion of the solids returning to the mixing chamber is directed thereto as an essentially downwardly directed solids flow and that the hot process gas is conducted to the mixing chamber as a flow of gas which is directed essentially upwardly and towards the flow of solids so that the flows of solids and gas contact.

It is characteristic of the apparatus according to the invention for achieving the objects of the invention that in a circulating fluidized bed reactor the return duct is connected from its lower part to the roof portion of the mixing chamber, into which is arranged a return opening for returning the solids into the mixing chamber, and that the hot gas inlet is provided in the bottom part of the mixing chamber vertically essentially below the solids return opening arranged in the roof portion of the mixing chamber.

By returning the flow of circulating solids of a circulating fluidized bed reactor directly above the gas inlet, i.e. venturi, the momentum-minimizing effect of the solids can be utilized to maximum extent.

According to the present invention the solids return system and the gas inlet can be arranged so that they are naturally vertically superimposed and, for example, so that the return system is not quite in the middle of the mixing chamber.

It is known, that in a fluidization chamber of the spouted-bed type the form of the flow depends on the amount of bed, bed material and gas flow. A surprising recent observation is that the form of the flow can be positively influenced by arranging the inlet of the mixing chamber and the return opening of the return duct so that the flow of hot gas contacts immediately on entering the mixing chamber even a small volume of cooled circulating bed material. Thereby the circulating material disturbs the flow of hot gas and prevents the hot gas jet from flowing directly through the mixing chamber towards the cooling surfaces located in the riser.

Another way of influencing the form of the flow in the mixing chamber is to arrange the mixing chamber gas inlet and the solids return opening of the return duct within such a suitable distance from each other that the flows of gas and circulating material contact and are mixed in a desirable way. The flow and cooling inside the mixing chamber can be adjusted to be suitable by means of proper placing of the inlets and their mutual spacing.

Preferably, the gas inlet and the return duct opening are arranged concentrically opposite each other so that the flows of gas and solids contact as essentially concentric flows. Thereby the flow of solids effectively reduces the momentum of the gas flow, cools the gas flow and disturbs it so that the flow spreads essentially over the whole of the cross-section of the mixing chamber.

The solution according to the invention enables the velocity of the gas flow in the mixing chamber to be reduced so as to prevent the gas from contacting the cooling surfaces when still hot. The invention allows the gas flow more retention time in the intermediate part of the mixing chamber, whereby the heat transfer or other reactions between the gas and the circulating material are enhanced.

In a preferable embodiment of the invention the mixing chamber is provided with essentially parallelly inclined bottom and roof portion. The inlet for the hot process gas is arranged in the lower portion of the inclined bottom and the return duct is arranged in the lower part of the inclined roof portion. Thus the hot gas and the circulating mass are brought to effectively mix at the lower part of the mixing chamber and flow in an angle from there towards the upper part of the mixing chamber as gas suspension. Thereby the gas flow is forced to change its direction before it flows from the upper part of the mixing chamber to the riser. This allows for a deceleration of the gas flow as well as an improved mixing and cooling of gas and the solids.

The method and apparatus according to the invention will in a simple way prevent the hot core flow of the gas from penetrating too deeply into the mixing chamber without mixing with the solids, whereby the negative effect of the hot, unpurified gases on the convection surfaces in the riser is avoided or greatly reduced.

Simultaneously, especially when both the gas and the circulating mass inlet means are provided in the lower part of the mixing chamber, the turbulence in the mixing chamber is improved and a better distribution of gas in the whole mixing chamber is provided, thereby also a better contact between the solids and the gas in the mixing chamber, which is desirable during, e.g. the reduction of iron concentrate.

Usually, the ability of a gas to lift solid material is the greater the more evenly the material is distributed in the gas flow. The invention enables the solids to be distributed more evenly, whereby the same volume of gas can lift correspondingly more solids to the riser. The increasing solids density in the riser has a heat transfer improving effect on the heat surface of the riser.

The positive effect the method and apparatus according to the invention have on the transverse mixing of the reactor is especially advantageous in larger units, in which the transverse mixing distance is longer.

BRIEF DESCRIPTION OF THE DRAWINGS

In the following, the invention is described in more detail with reference to the accompanying drawings, of which

FIG. 1 represents a circulating fluidized bed reactor 10 having a mixing chamber 12, a riser 14, a particle separator 16 and a return duct 18. A process, gas inlet or venturi 22 is formed in the lower part of the inclined bottom 20 of the mixing chamber.

The return duct 18 is arranged in the roof portion 19 of the mixing chamber 60 that it opens into the lower part of the mixing chamber so that the solids return opening 24 is arranged on top of the venturi 22, essentially concentrically therewith. As shown in FIG. 1, the solids return duct and the process gas inlet means are concentric, in which the cross-section of the process gas inlet means has no excess area in comparison to the cross-section of the solid return duct, and there is no obstruction between the solid return duct and the inlet means. Thereby the return flow effectively reduces the momentum of the hot process gases flowing to the mixing chamber and cools the gases. The recently formed, partly cooled gas suspension flows into the upper part of the mixing chamber and to the riser.

Figure 1:
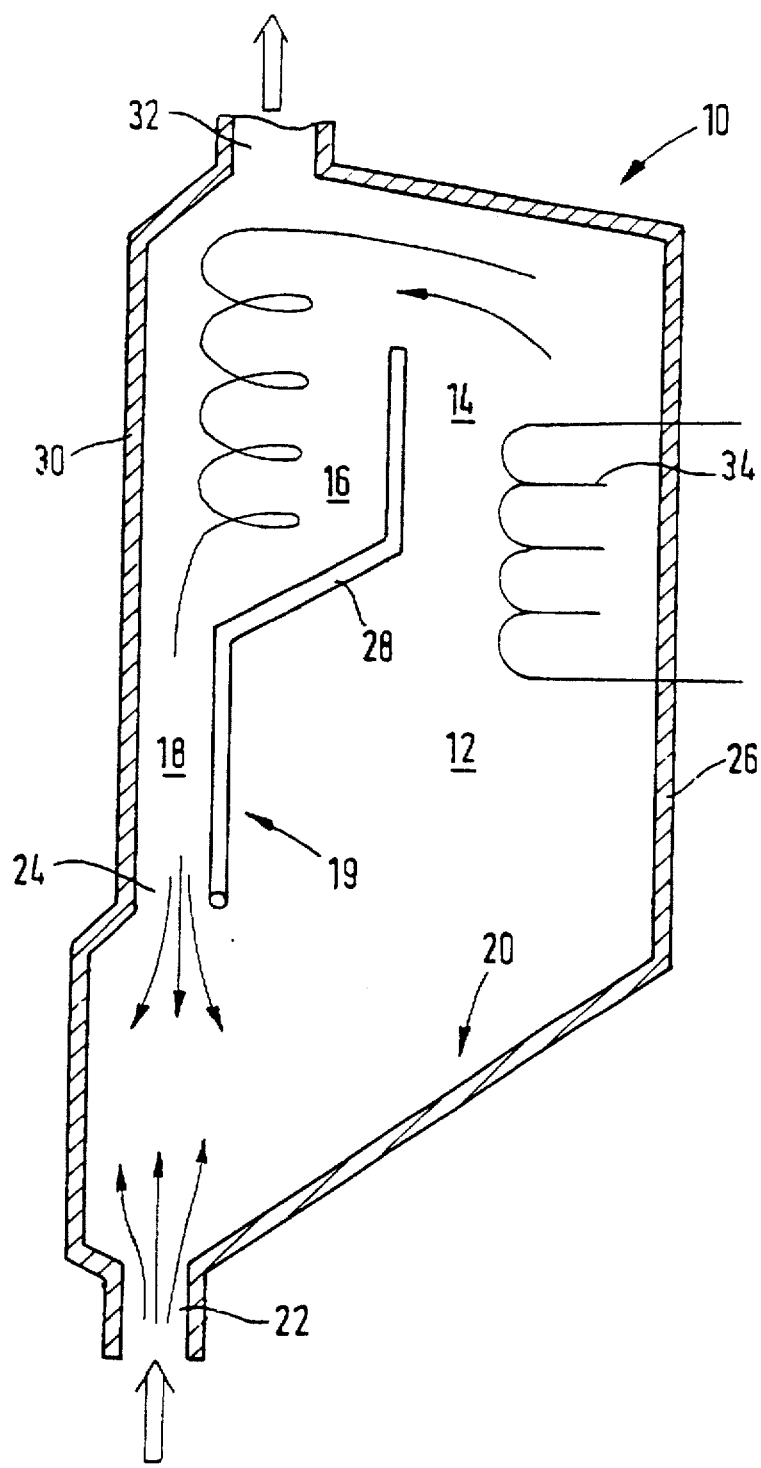
FIG. 1 is a schematic of an apparatus according to the invention in a circulating fluidized bed reactor.

In the gas cooler of FIG. 1 the particle separator is a vertical cyclone separator. The cyclone separator is formed by providing a partition wall 28 inside the shell construction 26 forming the gas cooler, the wall 28 separating both the cyclone separator 16 from the riser 14, and the return duct 18 from the mixing chamber 12.

Both the shell construction 26 of the gas cooler and the partition wall 28 can be formed from cooled water tube 10 panels by bending and connecting. The cyclone separator is thus formed of an elongated chamber remaining between the upper part of the reactor wall 30 and the upper part of the the partition wall 28 formed inside the reactor, the separator being provided with several adjacent gas vortices for separating the solids from the gas. The purified gases are removed from the reactor via outlet 32. The return duct 18 is formed by a narrow slot between the lower part of the wall 30 and the lower part of the partition wall 28.

The riser is provided with cooling surfaces 34 for cooling the gas suspension prior to the particle separator.

The fluidized bed reactor, for example the mixing chamber thereof, can be provided with inlets and outlet ducts for solids that are not shown in the figures, for, e.g., feeding and removing the concentrate from the reactor. If desired, the inlet and outlet ducts can also be arranged at other locations in the solids circulation.

The advantages of the cooled structure of FIG. 1 include, among others, the following:

due to the mutual location of the venturi 22 and the return opening 24 of the return duct 18 the gas cooling process is fast and reliable;

the location of the venturi and the return opening of the return duct in the lower portion of the mixing chamber effectively prevents erosion/blocking in the cooling surfaces of the riser;

the cooled structure is flexible in sudden changes of load;

the structure of the particle separator and the return duct are advantageous because they utilize the walls of the reactor shell; and scaling to larger units is easy.

Figure 2:
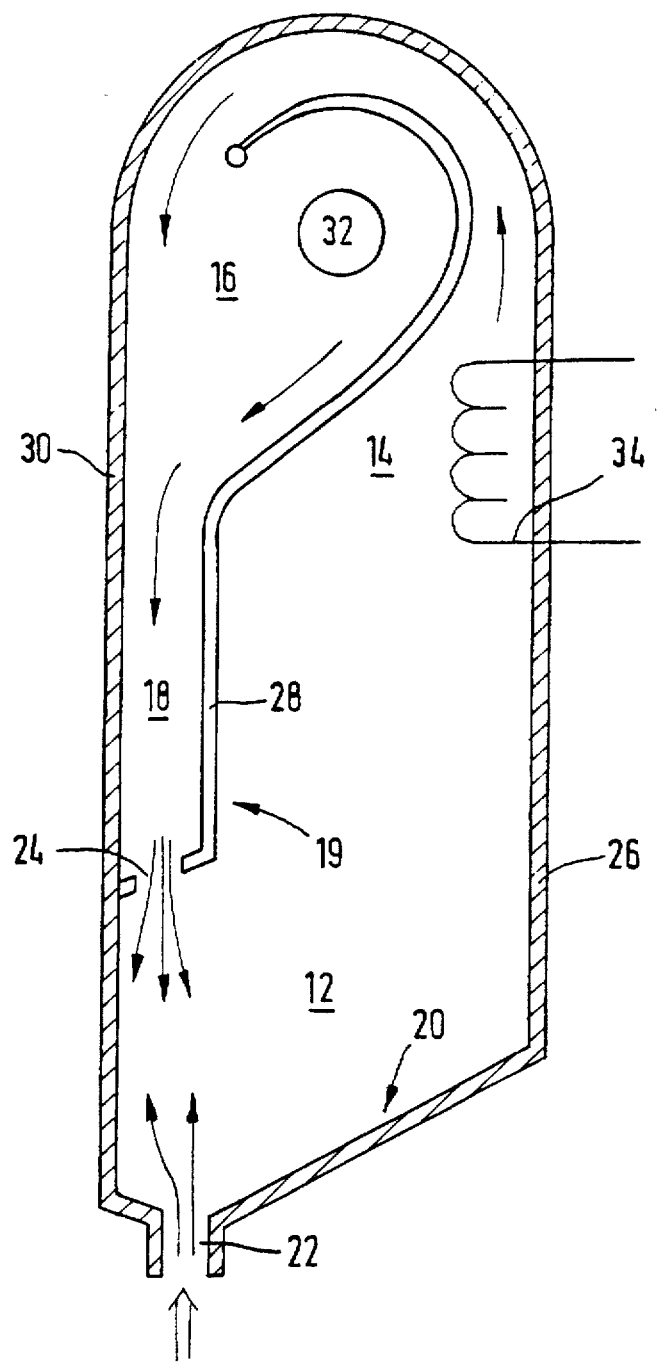
FIG. 2 is a schematic of an apparatus according to the invention in another circulating fluidized bed reactor.

FIG. 2 shows a gas cooler construction similar to that of FIG. 1 except that the particle separator 16 is a horizontal cyclone. The horizontal cyclone and the return duct 18 are formed by separating them front the reactor with a partition wall.

Figure 3:
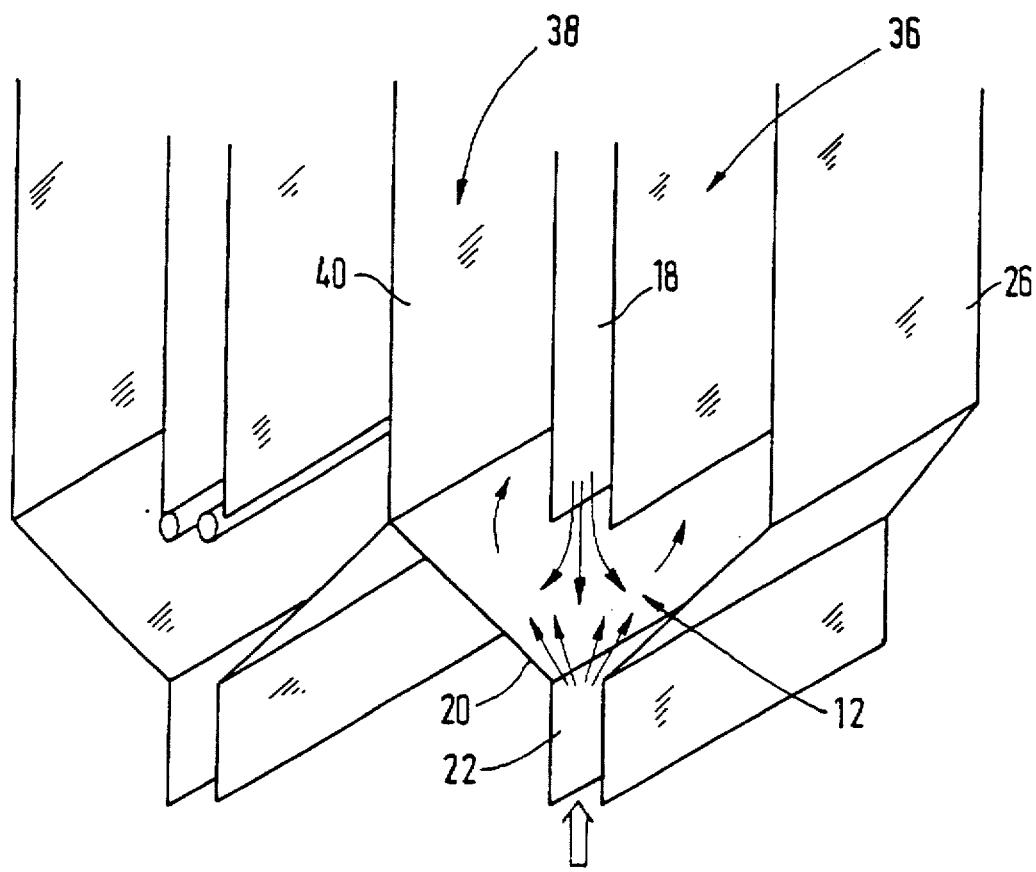
FIG. 3 is a schematic of an apparatus according to the invention in a third circulating fluidized bed reactor.

FIG. 3 represents a third embodiment of the lower part of the circulating bed reactor. The figure shows a gas cooler solution, in which an elongated return duct 18 formed of water tube panels is arranged in the intermediate part of the elongated, cooled reactor shell 26, parallel therewith. Accordingly, an inlet 22 having a rectangular cross-section, i.e. forming a narrow opening, is arranged in the middle of the bottom 20 of the elongated mixing chamber parallel therewith. The return opening 24 and the gas inlet 22 are positioned one on top of the other. From the mixing chamber the gas suspension flows upwards in the risers 36 and 38 as two flow of gas suspension on both sides of the return duct.

In the solution of FIG. 3 two gas coolers are connected together side by side. The gas coolers share one wall 40.

We claim:

1. A circulating fluidized bed reactor for treating process gases produced in high temperature processes, said reactor comprising:

a mixing chamber in which process gases are mixed with solids to form a gas suspension, said mixing chamber having a lower portion and an upper portion;

gas inlet means for feeding said process gases into said mixing chamber;

a particle separator;

a riser positioned above said mixing chamber and in communication therewith for conducting said gas suspension from said mixing chamber to said particle separator;

said particle separator for separating solids from said process gases in said gas suspension;

a gas outlet for removing said separated process gases from said particle separator, and a solids return duct for returning said solids separated in said particle separator to said mixing chamber, said return duct being disposed in said upper portion of said mixing chamber; and a lower part of said return duct having a solids return opening for returning said separated solids to said lower portion of said mixing chamber, and said gas inlet means being positioned in a bottom part of said mixing chamber vertically essentially below said solids return opening, said solids return duct and said gas inlet means being concentric, in which the cross-section of said gas inlet means has no excess area in comparison to the cross-section of said solids return duct, there being no gas distribution plate between said solids return duct and said gas inlet means, such that when the separated solids are returned to said mixing chamber through said solids return duct, said returned solids will exert a momentum-minimizing effect on gas flowing into said mixing chamber through said gas inlet means.

2. A reactor as recited in claim 1, wherein said particle separator is a cyclone.

3. A reactor as recited in claim 1, wherein said particle separator and said return duct are separated from said mixing chamber and said riser by a partition wall arranged inside said fluidized bed reactor.

4. A reactor as recited in claim 3, wherein said return duct has the shape of a slot.

5. A reactor as recited in claim 3, wherein said mixing chamber has a substantially parallelly inclined bottom portion and roof portion, said gas inlet means being disposed in a lower part of said inclined bottom portion of said mixing chamber, and said return duct being connected to a lower part of said inclined roof portion of said mixing chamber.

6. A reactor as recited in claim 1, wherein said riser comprises a heat exchanger.

* * * * *